United States Patent
Bergman

[15] 3,668,101
[45] June 6, 1972

[54] MEMBRANE ELECTRODES AND CELLS

[72] Inventor: Imanuel Bergman, Sheffield, England

[73] Assignee: National Research Development Corporation, London, England

[22] Filed: July 22, 1968

[21] Appl. No.: 746,436

[52] U.S. Cl. .................... 204/195, 117/107, 136/86 R, 136/120 FC
[51] Int. Cl. ........................................ G01n 22/46
[58] Field of Search ............... 136/86, 86 A–86 E, 136/120 FC; 204/1.1, 195

[56] References Cited

UNITED STATES PATENTS

| | | | |
|---|---|---|---|
| 3,065,151 | 11/1962 | Schaschl et al. | 204/195 |
| 3,222,224 | 12/1965 | Williams et al. | 136/86 |
| 3,227,643 | 1/1966 | Okun et al. | 204/195 |
| 3,239,444 | 3/1966 | Heldenbrand | 204/195 |
| 3,260,656 | 7/1966 | Ross | 204/195 |
| 3,351,544 | 11/1967 | Medlar | 204/195 |
| 3,445,369 | 5/1969 | Porter et al. | 204/195 |
| 3,454,485 | 7/1969 | Hauk et al. | 204/195 |
| 3,481,787 | 12/1969 | Adlhart | 136/86 |
| 3,357,908 | 12/1967 | Riseman et al. | 204/195 |
| 3,510,420 | 5/1970 | Mills | 204/195 |

Primary Examiner—T. Tung
Attorney—Cushman, Darby & Cushman

[57] ABSTRACT

A three component membrane electrode for use in electrical cells having in sequence, a gas-permeable membrane, an electrically conductive layer and a protective layer acting as a diffusion barrier to gas dissolved in the electrolyte. The gas permeable membrane preferably is a plastic material and the electrically conductive layer is preferably laid down on the gas permeable membrane in the form of minute non-coalescing globules of gold and/or silver.

2 Claims, 6 Drawing Figures

PATENTED JUN 6 1972 3,668,101

Imanuel Bergman
Inventor

By
Cushman, Darby & Cushman
Attorneys

MEMBRANE ELECTRODES AND CELLS

1. FIELD OF THE INVENTION

The invention relates to an electrical cell such as, for example, a polarographic cell, voltaic half-cell or fuel cell, which employs an electrode having a layer of electrically conducting material which is porous and through which an electrolyte can percolate; this layer adhering to a membrane of non-conducting material which is permeable to gases and vapors, i.e. has the property of allowing activated diffusion. Such electrodes are hereinafter referred to as "membrane electrodes." These electrodes may be used in cells employed in instruments for detecting an oxygen deficiency in an atmosphere, as for example in a mine where both blackdamp and firedamp may be present and where the partial pressure of oxygen may be too low to support life. Thus, in the case of an instrument for detecting an oxygen deficiency, the membrane is such that oxygen from the air will diffuse through it to the film of electrically conducting material which in this case constitutes the cathode of a polarographic electrolytic cell. This diffusion of oxygen produces a depolarization effect at the surface of the layer of electrically conducting material to control the magnitude of an electric current according to the rate at which this diffused oxygen reaches the cathode and, hence, upon the partial pressure of the oxygen in the atmosphere.

DESCRIPTION OF THE PRIOR ART

There are numerous references in the prior art to electrodes for use in electrical cells. These are, however, mainly concerned with simple single component electrodes. Two component electrodes have been proposed in which a button type electrode is combined with a selectively permeable membrane, preferably polyethylene, which will pass oxygen but forms a barrier for other substances. It has further been proposed to improve the membrane previously described described to ensure that the maximum diameter of the electrode where it is in contact with the electrolyte is in the same order of magnitude or less than the thickness of the selectively permeable barrier. A further proposal is an electrode for use in an oxygen sensing polarographic cell comprising a membrane on one side of which a microapertured cathodic material has been deposited by photographic or other suitable techniques.

These prior art two component electrodes suffer the disadvantage of having a limited area of available cathode and hence the device will be sluggish. Further disadvantages are that the electrodes lack stiffness and that the film of electrically conductive material may easily suffer mechanical damage or be contaminated by adventitious material.

BRIEF SUMMARY OF THE INVENTION

The object of this invention is to provide novel membrane electrodes for use in electrical cells as, for instance, polarographic cells, voltaic half-cells or fuel cells.

A further object of this invention is to provide an electrical cell containing these novel membrane electrodes.

Still further objects of the invention will become apparent hereafter.

These objects are met by providing a membrane electrode having in contact with that face of the electrically conducting layer which is remote from the gas-permeable membrane, a protective layer of material which will be electrolyte-permeable or porous to the electrolyte.

BRIEF DESCRIPTION OF THE DRAWINGS

The invention is illustrated, by way of example, by the accompanying drawings.

In the drawings.

DETAILED DESCRIPTION OF THE INVENTION

Figure 2:
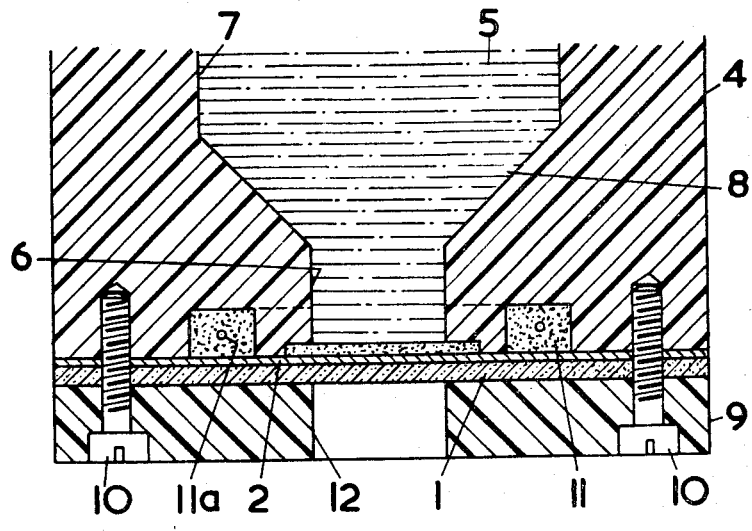
FIG. 2 is a sectional view showing the electrode applied to a polarographic cell or voltaic half-cell.

According to this invention a membrane electrode has in contact with that face of the electrically conducting layer which is remote from the gas-permeable membrane, a protecting membrane or layer of electrolyte-permeable or porous material. This protecting layer must be permeable to the electrolyte, and the more substantially it acts as a barrier to a gas such as oxygen dissolved in the electrolyte the better this is for the polarographic action of the electrode. The thickness of the protective layer may be within the range of from ½ to 1 millimeter. The addition of this protecting membrane, which renders the electrode essentially a three layer structure, gives a certain stiffness to this structure as well as protecting the thin layer or film of electrically conductive material from mechanical damage and from the deposition of particles suspended in the electrolyte solution or originating from the counter electrode. In cases where the liquid electrolyte is liable to be depleted, e.g. by evaporation, the operation of the cell can be prolonged by attaching a wick-like material, that is not likely to be attacked by the electrolyte, between the counter electrode and the protecting membrane. The cell would then continue to operate as long as the protecting membrane and wick continued to provide an electrolyte path (i.e. a "salt bridge"). The protecting layer may be of a material such as is used for dialysis membranes. Such a dialysis membrane or layer may be formed by the deposition of collodion from solution, or a material such as acrylamide may be polymerized to form an electrolyte permeable substance of which the layer may be formed.

The first-mentioned membrane to which is attached the porous layer or film of conducting material may be of polytetrafluoroethylene (P.T.F.E.) which is non-porous but has a high permeability of oxygen, and the thin layer or film of conducting material thereon may be of gold or silver which may be deposited on the P.T.F.E. by vacuum evaporation, this layer or film being sufficiently porous to be permeable to the electrolyte. Instead of P.T.F.E. other plastics may be used, for example silicone or other rubber or polyethylene. Silicone rubber has an advantage in that it has a low temperature coefficient of permeability.

The plastic membrane which carries the porous layer or film of conducting material is permeable so that gas and not liquid will pass into and through it by activated diffusion. This membrane is preferably of high permeability so that it does not require to be too thin in order that the apparatus shall have a fast response to changes in oxygen partial pressure.

A preferred method of application of the metallized layer to the plastic membrane is by vacuum evaporation, which may be carried out in an apparatus such as is used in electron microscopy. A number of pieces of membrane may be supported, e.g. on microscope slides, at a distance of about 15 c.m. above the evaporation source, a molybdenum boat. About 55 mg. of pure gold, usually in the form of 4 mm. lengths of about 0.6 mm. diameter wire, are placed in the boat and evaporated in the space of a few seconds at a vacuum of about 0.1 torr by electrically heating the boat. This operation may be followed by the evaporation, under similar conditions, of a similar volume (30 mg.) of pure silver onto the gold layer. It is not by any means essential to use both these metals, or indeed either of these particular metals, but this particular combination has been found quite suitable, although other metals or combinations of metals may be used to suit requirements or necessary functional standards, to provide conducting layers on any of the plastics hereinbefore mentioned or such others as may be suitable.

The amounts of metal are not at all critical, as the metal film may in some cases not only be transparent, but invisible. If the metal is evaporated rapidly, a conducting film is produced from only a very small quantity of metal. The conductivity of a very thin metal film may be low, but this is relatively unimportant in polarography. At the other extreme, the metal film may be thickened by several um. by multiple evaporations, or even by subsequent plating from solution, without adverse effect. The optimum result to be achieved appears to be the production upon the membrane of a contiguous layer of metal particles of small enough diameter to provide a sufficiently large surface area of electrode/electrolyte interface very close to the surface of the membrane. Provided the subsequent depositions leave a sufficiently conductive electrolyte path from the counter electrode to this layer of particles, the performance of the electrode is not affected.

The rounded particles of metal deposited upon the membrane by the above described procedure may be of a diameter between 50 and 100 A.U. In the case of a monolayer of such particles of spherical shape and in hexagonal close packing, the effective area presented by these globules or spherical particles will be almost three times that of the membrane on which they are deposited. A considerable advantage is that this area is available as a solution/metal interface situated at less than 100 A.U. from the membrane. The discontinuities in the metal layer will be less than 100 A.U. apart, so that as far as the oxygen diffusion is concerned even with the thinnest membrane used (thickness 3 $\mu$m = 30,000 A.U.), viewed across the membrane, the metal layer will present a uniform and sufficient area for the diffusion geometry to be effectively that dictated by the area of the membrane common to both gas and solution.

The metallized layer adheres to the membrane much better than metals normally adhere to materials like P.T.F.E. because of the small size of the metal particles. The layer follows the surface of the membrane so well, including any roughnesses or imperfections, and thus keys to it. At a size of less than 100 A.U. the adhesion of particles can also be explained in terms of molecular forces. In a contiguous layer of metal particles of diameter less than 100 A.U., the average pore diameter will be several times smaller than this dimension.

Figure 1:
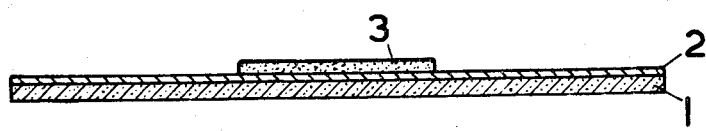
FIG. 1 is a cross-sectional view of an electrode according to the invention.

Referring to FIG. 1 of the accompanying drawings the electrode shown comprises a membrane 1 of P.T.F.E. or other suitable material which is permeable to oxygen but not to liquid and has on one face a layer or film 2 of electrically conducting material which is permeable to the electrolyte, while the face of this film remote from the membrane 1 is provided with a membrane 3 of material which is sufficiently porous to afford the electrolyte ready access to the conductive layer or film but has sufficient strength to reinforce the electrode over the area thereof which will be in use.

In FIG. 2, the electrode just described is shown applied to apparatus comprising a tubular body 4 containing electrolyte 5, this body having a reduced bore portion 6 at one end, between which reduced bore portion and the main bore portion, indicated by 7, is a tapered bore portion 8. The part of the end face of the body 4 immediately around the outer end of the reduced bore portion is undercut to receive the membrane 3 of the electrode which latter is clamped in position against this face by a ring 9 held in position by screws 10, a contact ring 11, which makes electrical contact with the layer or film 2, being provided within a channel machined in the said face. This contact ring may be made of a silver-powder-filled-epoxy-resin encapsulating a silver wire 11a which is led to the outside of the body 4, although this is not shown. The bore 12 of the ring 9 is the same diameter as the bore portion 6 and permits the entry of gas to the apparatus and through the membrane 1.

The membrane 3, instead of being adhered to the conductive layer or film 2 may be unattached.

Figure 3:
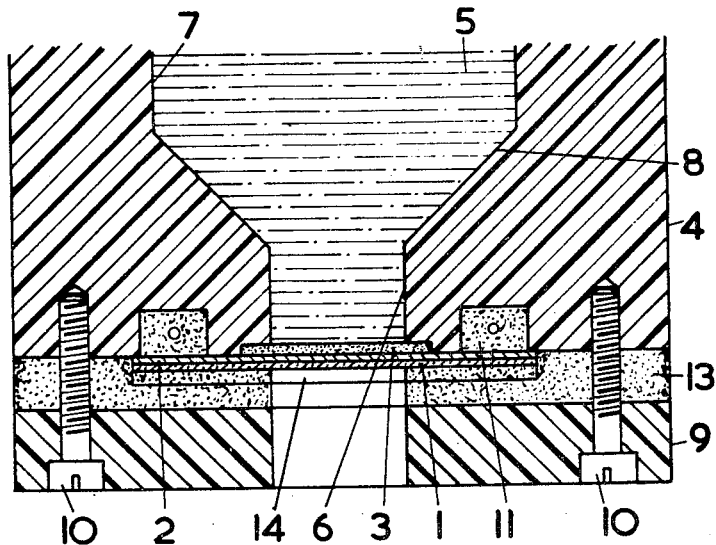
FIG. 3 is a similar view showing a modification.
Figure 4:
FIGS. 4 and 5 are sectional views showing certain details.
Figure 5:

An alternative manner of defining the area of operation of the electrode is shown in FIG. 3 which consists in clamping it into the face of a rubber gasket 13 together with a partly porous disc 14 of which the central portion registering with the bore of the gasket is the porous portion. The disc 14 also protects the electrode at the side of the membrane 1 remote from the conductive layer or film 2. The partly porous disc 14 may be made by forming a ring 15 and disc 16 of suitably porous plastic or porous (e.g. sintered) metal, as shown in FIG. 4, and pressing these together to form a single disc, as shown in FIG. 5, the central portion only of which remains porous. There is an alternative method of making such a disc, namely, by ionizing radiations which serve to cross-link certain polymers with the effect of lowering their permeability, to oxygen for example. During this subjection of suitable polymers to this ionizing radiation the original permeability of the disc may be preserved at the center by applying suitable shielding for example a lead disc of the requisite area.

The layer 3 may be replaced by a layer of acrylamide which has been polymerized to form an electrolyte permeable layer or membrane on the metal layer or film. This layer or film of polymerized acrylamide could in some cases be thickened so as also to form, as it were, a plug within the reduced bore portion 6.

Figure 6:
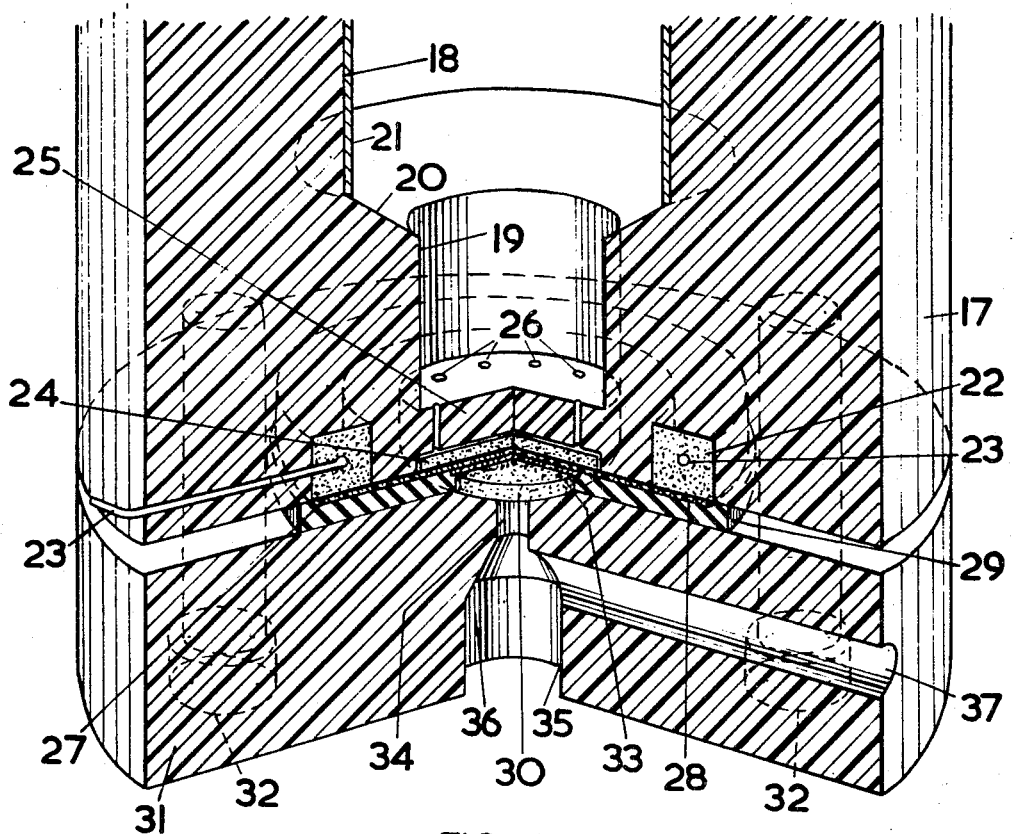
FIG. 6 is a sectional view showing a further modification.

The construction shown in FIG. 6 comprises a body portion 17 having a central bore 18, a reduced bore portion 19 terminating slightly above one end face of the body portion 17, and an intermediate, tapering, bore portion 20. Disposed concentrically within the bore portion 18 is a cylindrical silver anode 21 connected to a conductor (not shown), sealed in and passed out through the wall of the body 17. One end face of the body 17 is recessed to carry a contact ring 22, similar to the ring 11 shown in FIGS. 2 and 3, having a conductor 23 which is passed out through the wall of the body 17. This construction includes a protecting dialysis membrane 24 of electrolyte permeable material, which membrane fits within a suitably undercut portion within the end face of the body 17, which undercut portion is concentric with the axis of the bore of the said body so that a wall 25 is formed between this undercut portion and one end of the said bore. This wall 25 forms a support for the membrane 24 and is provided with perforations 26 to provide communication between the bore and the dialysis membrane 24. The dialysis membrane 24 is in effect sealed within the undercut portion and its outer face is in contact with metallic surfacing 27 of a P.T.F.E. membrane 28 which may be of 6 $\mu$m. thick. The metallic surface coating or layer 27 is produced by vacuum coating the surface of the membrane 28 with silver. The membrane 28 is held tightly in this position by a combined rubber gasket 29 and a porous polythene disc 30 set into the central perforation of the gasket, which gasket and disc are clamped between the side of the membrane 28 remote from the coating or layer 27 and a plate 31 held by screws such as 32 to the end face of the body 17. Clamped between the central portion of the polyethylene disc 30 and the membrane 28 is a thin filter disc 33. The plate 31 is provided with a central opening having a small bore portion 34, and enlarged bore portion 35 and a middle, tapered, bore portion 36. This central opening constitutes the main entry passage for gas into the apparatus.

Extending radially into the plate 31 from the outer edge thereof to the tapered bore portion 36 is a test gas flow passage 37. This test gas flow passage 37 would be used to calibrate the device with gas, for example from cylinders, or to permit gas to be introduced into the apparatus from sampling bulbs. When the cell is to be used, the body 17 would be filled with a saline electrolyte, and the upper part of the body 17 would be provided with a lid (not shown).

Ideally, the metallized membrane 28 should be sandwiched between materials which are firm and smooth, so that the metallized layer is disturbed neither by flexing nor by distortion. The electrolyte-permeable membrane 24 is smooth, especially when backed by the flat wall 25 which also contributes effectively to the stiffness of the electrode assembly. On the gas flow side of the membrane 28 it is most desirable to employ a material which is not rough, and is porous enough not to introduce a delay in the response of the apparatus to changes in the atmosphere and in this connection it has been found satisfactory to use a thin disc 33 consisting of a smooth and highly porous membrane filter, which is supported by a stronger but rougher polyethylene disc 30.

An electrode according to this invention may be used as a hydrogen electrode to measure the pH of the electrolyte or the partial pressure of hydrogen. With the dialysis membrane or similar diffusion restricting layer, the metallized membrane electrode may be used to detect the presence of basic or acidic gases or vapors, since the effect of these gases on the film of electrolyte contained between the plastic membrane and the dialysis membrane will be rapid and large. If these acidic or basic gases are contained in hydrogen, then a platinum or palladium metallized membrane will measure the change in pH. Otherwise an electrolyte containing quinhydrone may be similarly used. A solution containing quinhydrone and bicarbonate in combination with a platinum group metal electrode will act as a $pCO_2$ electrode.

What is claimed is:

1. An electrode assembly for use in an electrical cell comprising: a non-porous, gas-permeable, electrically insulating membrane; a porous, electrically conducting layer consisting of particles which adhere to each other and to one face of said membrane; and a protective layer of electrically insulating material, said protective layer being permeable to an electrolyte and being in contact with that face of said conducting layer remote from said membrane, said electrically insulating material of said protective layer being collodion.

2. An electrode assembly to claim 1 in which said conducting layer consists of globules of diameter between 50 and 100 Angstrom units.

* * * * *